United States Patent [19]

Sands et al.

[11] Patent Number: 4,984,362
[45] Date of Patent: Jan. 15, 1991

[54] METHOD FOR FORMING A BALL VALVE CONNECTION

[75] Inventors: Robert E. Sands, Shelbyville; Carl E. Floren, Decatur, both of Ill.

[73] Assignee: Mueller Co., Decatur, Ill.

[21] Appl. No.: 476,603

[22] Filed: Feb. 7, 1990

Related U.S. Application Data

[62] Division of Ser. No. 415,615, Oct. 2, 1989.

[51] Int. Cl.$^5$ .......................... B23P 13/02; B23C 3/28
[52] U.S. Cl. ................................. 29/890.128; 409/131
[58] Field of Search ..................... 29/890.122, 890.123, 29/890.126, 890.128, 890.129, 402.06, 402.08, 557, 558; 409/131, 132, 203, 213, 217; 407/51, 31; 251/315

[56] References Cited

U.S. PATENT DOCUMENTS

| | | | |
|---|---|---|---|
| 2,774,631 | 12/1956 | Wahlin | 29/557 X |
| 2,890,017 | 6/1959 | Shafer | 29/890.128 |
| 3,411,746 | 11/1968 | Scaramucci | 29/890.129 |
| 4,678,161 | 7/1987 | Bando et al. | 215/315 X |

FOREIGN PATENT DOCUMENTS 83516  6/1980  Japan ..................... 409/131

Primary Examiner—William Briggs
Attorney, Agent, or Firm—Cushman, Darby & Cushman

[57] ABSTRACT

A method of manufacturing a ball valve member for cooperation with a valve and a ball valve member includes utilizing a cutting tool having first and second annular cutting surfaces with one of the cutting surfaces having a smaller radius than the other cutting surface whereby a slot is cut in the surface of the ball valve member to a greater depth than heretofore possible for permitting greater penetration of a valve stem into the ball valve member and recess is formed adjacent the slot for the ball valve stem for receiving a lug member mounted on the stem to increase torque transmission to the ball valve element when the operation step is rotated.

5 Claims, 3 Drawing Sheets

METHOD FOR FORMING A BALL VALVE CONNECTION

This is a division of Application No. 7/415,615, filed Oct. 2, 1989.

FIELD OF THE INVENTION

The present invention relates to a method of constructing a ball valve member and, more specifically, for providing a stronger cooperation between an operating stem of a ball valve and the ball member itself to thereby increase the turning effort required to cause failure of the assembly at the ball-stem connection.

BACKGROUND AND SUMMARY OF THE INVENTION

Ball valve members have long been in use especially in the field of gas and water distribution systems. In general, ball valve members have included a housing having an opening through which an operating stem is inserted to engage a surface slot or groove formed in a ball of the type having a through bore for movement into and out of alignment with conduits connected to the housing of the ball valve member. Internal seals engage the arcuate surface of the ball valve member to provide a secure seal over the life of the valve. However, it frequently happens that due to debris accumulating in and about the seals in the ball valve member, frozen liquid or the like, difficulty in rotating the ball valve through the operating stem engaged therewith has resulted in disconnection or breakage of the stem or the portion of the stem engaged in a slot formed in the surface of the ball valve.

While a number of attempted solutions have been proposed to increase the strength of the ball-stem connection, many of these have been relatively expensive to employ in a mass production facility or have proved impractical to adapt to a valve housing that has been prescribed by regulatory authorities.

In the past, the formation of the receiving slots in the surface of a ball valve member has been effected by use of a milling tool such as a key slot cutter or an end mill tool which is indexed to cut across the body of the ball valve to form a recess for cooperation with the tip of an operating stem. This was a time-consuming and labor-intensive operation which significantly contributed to the cost of the individual ball valve members.

With the operation of the present invention, the cost of manufacturing the ball valve for ready cooperation with an operating stem will be significantly reduced while significantly increasing the strength of the connection once effected.

The present invention provides an improved method of forming a ball valve member with a receiving slot whereby a connection with an operating stem can be effected that will be a stronger ball-stem connection yet less expensive than those connections utilized previously. In addition, a flow indicating feature is provided whereby a user will be readily able to determine the oriented condition of the ball valve member in establishing a connection with a stem either at the factory or in the field in an established fluid distribution system.

In a preferred embodiment, a cutting tool of the type having first and second annular cutting surfaces is employed where one of the annular surfaces has a reduced diameter relative to the other of the cutting surfaces. In carrying out the method of the present invention, the cutting tool is oriented generally perpendicularly to the through bore of the ball valve member and then is moved transversely to the ball valve surface to commence cutting a slot which has a longitudinal axis that extends perpendicular or parallel to the axis of the through bore. Cutting is continued until the second cutting surface which has a smaller radius than the first cutting surface engages and cuts a small recess adjacent to the slot for the operating stem. In some constructions, this will permit the main or first cutting surface to cut entirely through the thickness of the ball valve member to form an opening to the through bore of the ball valve but will always allow deeper penetration of the cutter than with the standard single cutter diameter.

With this arrangement, a much deeper penetration with a smaller diameter cutter of the ball member by the operating stem can be effected with a smaller diameter cutter, thus greatly increasing the strength of the connection between the operating stem and the ball valve member.

The foregoing and other advantages of this invention will become apparent to those skilled in this art as consideration is given to the following detailed description taken in conjunction with the accompanying drawings in which:

IN THE DRAWINGS

DETAILED DESCRIPTION OF THE INVENTION

Figure 1:
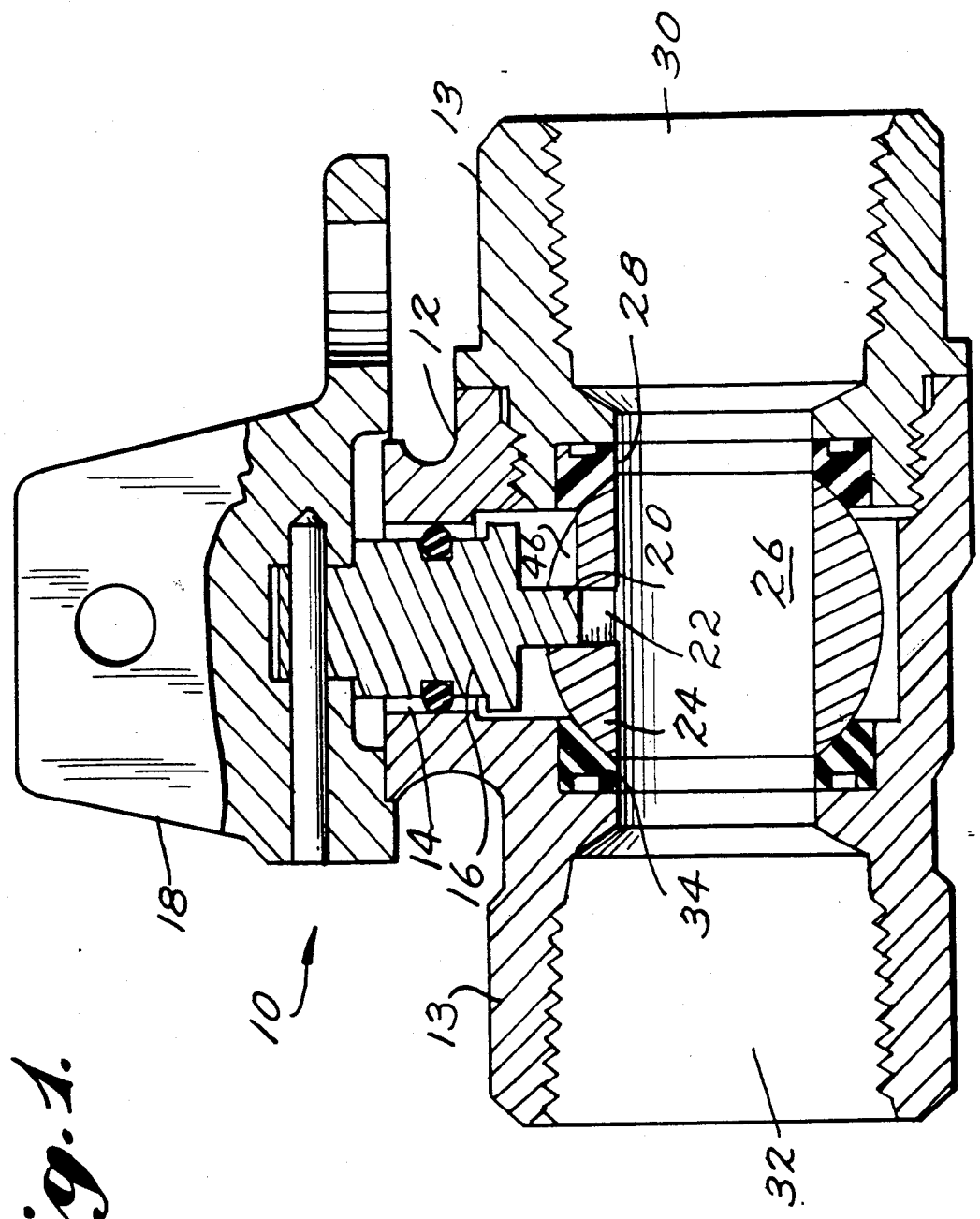
FIG. 1 is a side view in elevation, partly in section, of a ball valve member housing and stem of the present invention.

With reference to FIG. 1, there is shown a ball valve assembly 10 which includes a housing 12 having threaded ends for receiving internally or externally threaded couplers 13 which, in turn, are adapted for threaded interengagement with fluid distribution system conduits. The housing 12 has centrally of its longitudinal axis a stem receiving bore 14 in which is located an operating stem 16 which extends exteriorly of the housing and terminates in a flange or handle 18. The stem 16 has at the end opposite handle 18 an interengaging lug 20 which is received in a slot 22 having curved side walls and formed on the surface of ball valve member 24. The ball valve member has a central through bore 26. In a standard operation, a user rotates the handle 18 to directly transfer rotary motion to the ball 24 to bring the through bore 26 into or out of alignment with the flow passages 30 and 32. Annular, flexible seals 28 and 34 are disposed in recesses provided on the interior of the threaded couplers 13 so that the interior surfaces thereof will respectively engage in a sealing manner the exterior surface of the ball valve member 24 for all of its positions of operation.

Figure 2:
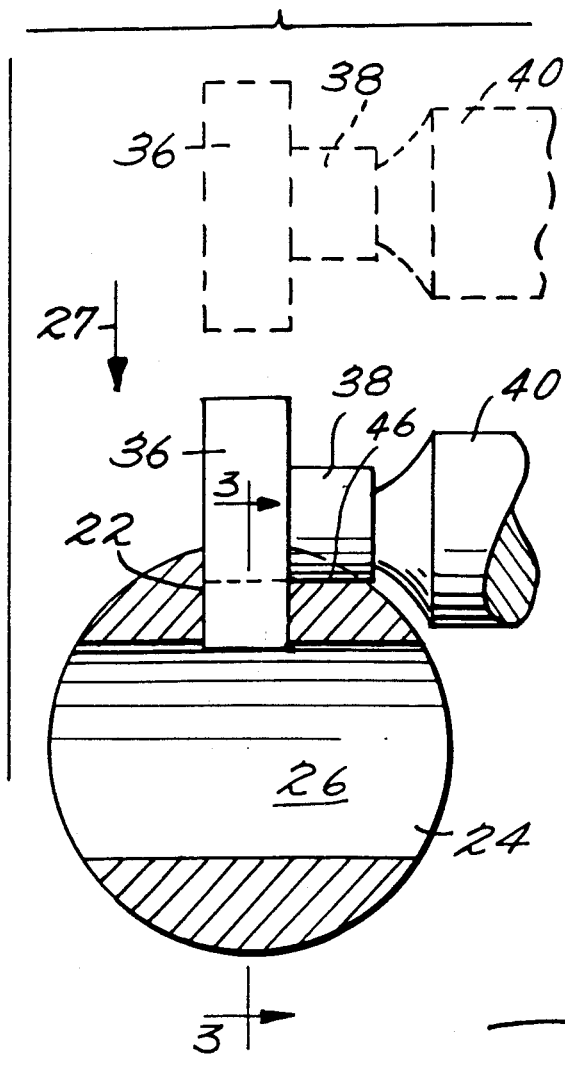
FIG. 2 is a view looking perpendicular to the axis of the bore of the valve member and of the cutting tool and illustrating its operation while carrying out the method of the present invention.

With reference now to FIG. 2, the steps of the method of forming the slot 22 and the auxiliary recess 46 are illustrated. In carrying out the method, use is made of a rotary cutting tool having a first cutting surface 36 in the form of an annular wheel having a selected radius and a second cutting surface 38 located on a common axis of rotation of a rotary tool 40 but having a radius smaller than the radius of wheel 36. The width of wheel 36 is approximately that of the slot to be formed. The surfaces of each of the wheels 36 and 38 are preferably standard milling cutters. They can be coated with a hard grinding material such as a carbide or diamond grit. Other types of cutting surfaces may, of course, be employed as will be apparent to those skilled in this art.

Figure 3:
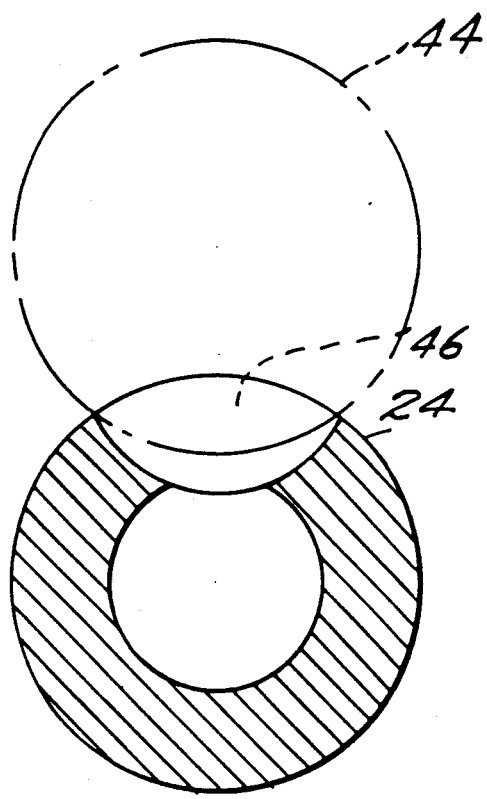
FIG. 3 is a sectional view taken along lines 3—3 of FIG. 2 but with the tool removed and showing, for comparison purposes, the depth of penetration of the slot formed according to a method previously used in this art.

With the ball valve member 24 located in a suitable clamping device, not shown, the axis of rotation of the cutting tool 40 may be oriented parallel to the axis of the through bore 26 of the ball valve member 24. It will be apparent, however, that the slot 22 can be cut in either direction but parallel is preferred. The cutting tool 40 is indexed or moved perpendicularly to the axis of the bore 26 in the direction of arrow 27 to commence the cutting operation. The cutting is effected by the rapid rotation of the wheels 36 and 38 as the tool 40 is moved continuously in the direction 27. Due to its greater radial dimension, the wheel 36 will first cut a major portion of the slot 22. As the cutting continues, the cutting surface of the wheel 38 will commence its cutting operation to form a recess 46 contiguous to or immediately adjacent and opening onto the space formed by the slot 22. To provide the maximum depth for penetration by the valve stem 16, the slot 22 is cut until the wheel 36 penetrates through to the bore 26 as illustrated in FIG. 2. The opening provided as at 48 (FIG. 4) will allow a manufacturer greater flexibility in designing a stronger ball-stem connection. As shown in FIG. 3, a conventional cutter 44 is illustrated to emphasize the difference in depth achievable by the use of the present invention where a smaller tool 36 is employed. The same depth as achieved with the smaller tool 36 can be obtained with the conventional cutter 44 but this would entail machining away from the sealing arteas on the end of the ball. Normally, such a smaller tool would have a reinforced column to enable the tool to be efficiently operated on the relatively hard metals employed in the manufacture of the ball valve member 24. However, the provision of the auxiliary cutting surface or wheel 38 reinforces the mounting of the cutting tool on the rotary drive of the tool 40 thereby allowing a smaller tool radius for the wheel 36.

Figure 4:
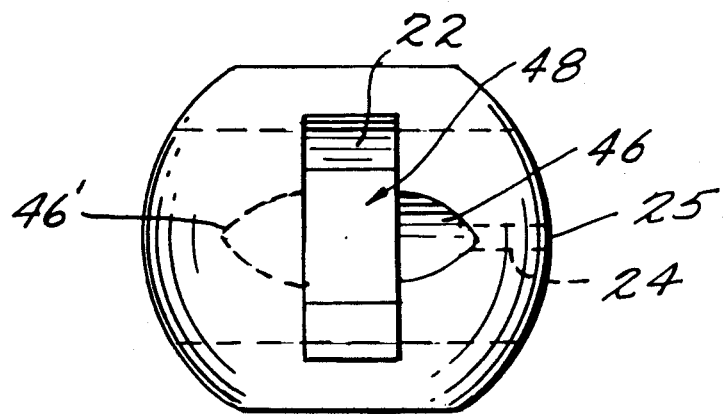
FIG. 4 is a top plan view of a finished ball valve member.
Figure 5:
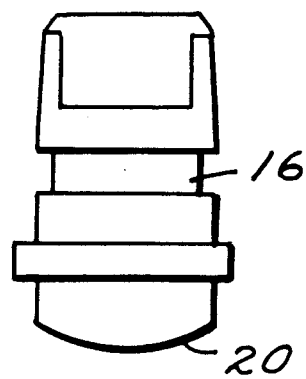
FIG. 5 is an elevational view of a valve stem modified to cooperate with the ball valve member of the present invention.

As shown in FIG. 4, the recess 46 formed by the second cutting wheel 38 provides a recess which indicates the orientation of the through bore 26 even when the position of the slot 22 is obscured by a valve stem. This can be a great advantage in assembling the valve structure as well as in ball valves where the ball includes a drain hole 25 which must be directed downstream when the valve is closed. As shown in FIG. 5, the lug 20 of the valve stem 16 is provided with a curved end to match the curvature of the slot 22 in the ball member 24

Figure 7:
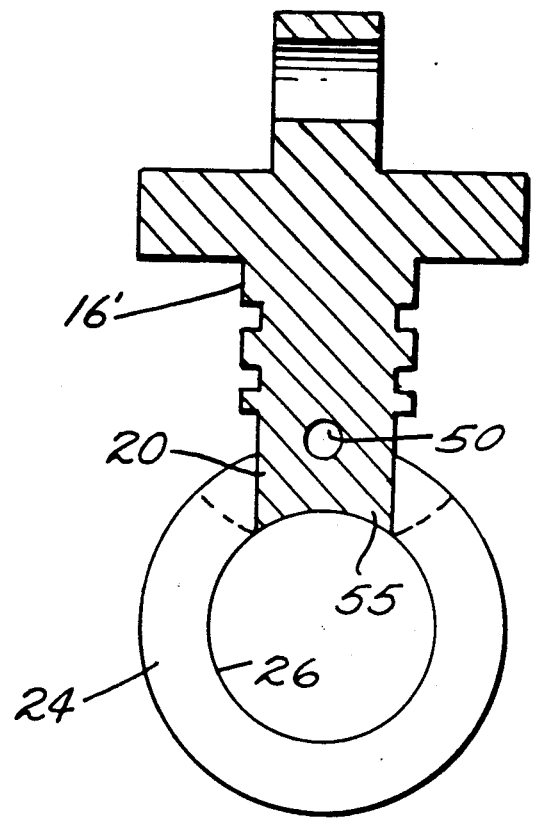
FIG. 7 is a view similar to that of FIG. 5 but showing an alternate embodiment of the invention.

As shown in FIG. 7, a projection such as a srew 50 may be provided on the stem 16' for engagement in the recess 46 when the stem is assembled on the ball valve member 24. With such an arrangement, the turning moments generated upon rotation of the stem 16 will be more effectively transmitted to the ball valve member 24 thus greatly enhancing the strength of the ball-stem connection. In the embodiment of FIG. 7, greater penetration of the stem 16' is achieved as the end 55 of the stem 22 is concavely curved to match the radius of curvature of the through bore 26 of the ball member. This will provide a stronger connection without interference with the flow through the bore 26.

Figure 6:
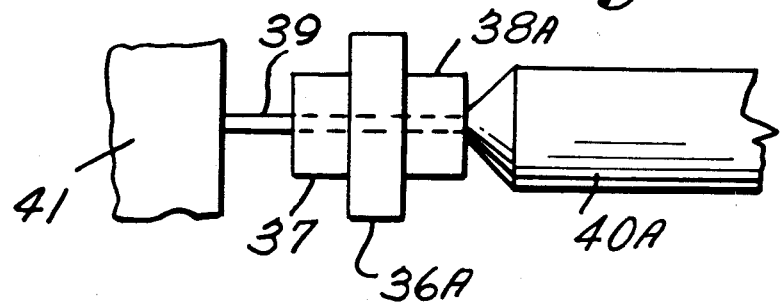
FIG. 6 is schematic view of an alternate cutting tool useful in the present invention.

In FIG. 6, an alternate cutting tool 40A is shown and which differs from the tool 40 of FIG. 2 in that a second reduced diameter cutting wheel 37 is provided on the side of main cutting wheel 36A opposite reduced diameter cutting wheel 38A. With tool 40A, greater stability in the forming operation will be achieved as the axle 39 which defines the common axis of rotation for the three wheels is supported at its end remote from tool 40A in a bearing support 41 which will be mounted for movement with tool 40A. With this tool, a second, recess 46' will be formed as shown in phantom lines in FIG. 4. The cooperating stem may also be modified to include a second protrusion identical to element 50 but on the opposite side of the stem 20 to cooperate with recess 46'.

Having described the invention, it will be apparent to those skilled in this art that various modifications may be made thereto without departing from the spirit and scope of this invention as defined in the appended claims.

What is claimed is:

1. A method of forming a connection in a ball valve member for cooperation with an operating stem member with the use of a cutting tool of the type having a first annular cutting surface of a selected radius and a second annular cutting surface having a radius smaller than said selected radius and the cutting surfaces being mounted on a common axis for rotation and mounted contiguous to one another, the steps comprising:
    (a) orienting the axis of the through bore of the ball valve member in a selected position relative to the axis of rotation of the cutting tool,
    (b) moving the cutting tool substantially perpendicularly toward the axis of the through bore of the ball valve member to commence cutting an arcuate slot in the surface of the ball valve member using the first annular cutting surface,
    (c) continuing the cutting of step (b) while forming a recess in the surface of the ball valve member with the second cutting surface with the recess extending substantially perpendicular to the slot being formed with the first cutting surface.

2. The invention as claimed in claim 1, including the step of orienting the axis of the through bore of the ball valve member parallel to the axis of rotation of the cutting tool.

3. The invention as claimed in claim 1, including the step of cutting with the first cutting surface through the surface of the ball valve member to form an opening into the through bore.

4. The invention as claimed in claim 3, including the step of cutting with the first cutting surface to a depth where curved side walls are provided on either side of the opening.

5. The invention as claimed in claim 1, including the step of providing a third cutting surface on the side of said first cutting surface opposite said second cutting surface and cutting another recess in the surface of said ball valve member with said third cutting surface.

* * * * *